United States Patent [19]

Crowder et al.

[11] Patent Number: 5,725,297
[45] Date of Patent: Mar. 10, 1998

[54] ILLUMINATED METAL GRATE

[75] Inventors: Judith M. Crowder; DeAnn McKinley, both of Fort Worth, Tex.

[73] Assignee: McKinley Tree Grate Co., Inc, Fort Worth, Tex.

[21] Appl. No.: 570,679

[22] Filed: Dec. 11, 1995

[51] Int. Cl.$^6$ ............................................. F21V 9/16
[52] U.S. Cl. ................................. 362/84; 362/805
[58] Field of Search ..................... 362/84, 122, 123, 362/267, 290, 311, 354, 396, 805, 227

[56] References Cited

U.S. PATENT DOCUMENTS

| | | |
|---|---|---|
| D. 229,080 | 11/1973 | Mihm . |
| D. 268,084 | 3/1983 | Haggard . |
| D. 270,609 | 9/1983 | Haggard . |
| D. 274,111 | 6/1984 | Haggard . |
| D. 274,210 | 6/1984 | Haggard . |
| D. 283,003 | 3/1986 | McKinley . |
| D. 285,406 | 9/1986 | Haggard . |
| D. 291,049 | 7/1987 | Haggard . |
| 640,140 | 12/1899 | Lloyd . |
| 1,719,518 | 7/1929 | Nissen et al. ............... 362/227 |
| 1,921,614 | 8/1933 | Frei . |
| 2,279,182 | 4/1942 | Snyder . |
| 2,437,522 | 3/1948 | Handler ................... 362/354 |
| 3,052,372 | 9/1962 | Shephard ................. 362/354 |
| 4,328,532 | 5/1982 | Smith ..................... 362/290 |
| 4,594,646 | 6/1986 | Von Kohorn et al. . |
| 4,686,611 | 8/1987 | Von Kohorn . |
| 4,858,085 | 8/1989 | Von Kohorn . |
| 5,003,724 | 4/1991 | Vestuti . |

Primary Examiner—Y My Quach
Attorney, Agent, or Firm—Laubscher & Laubscher

[57] ABSTRACT

A grate having at least one open slot area includes a translucent insert arranged in the open area and an electroluminescent lighting strip directing light through the translucent insert, thereby decoratively lighting the open area. The translucent insert, electroluminescent lighting strip, and various electrical connections are contained in a housing resiliently mounted beneath the grate.

10 Claims, 5 Drawing Sheets

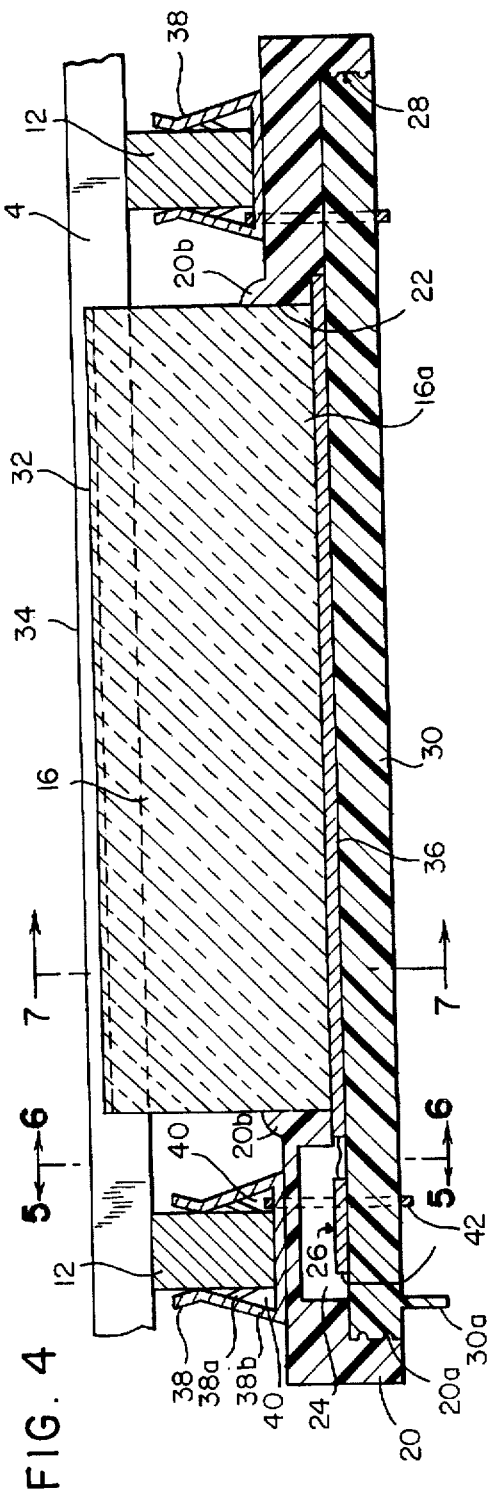
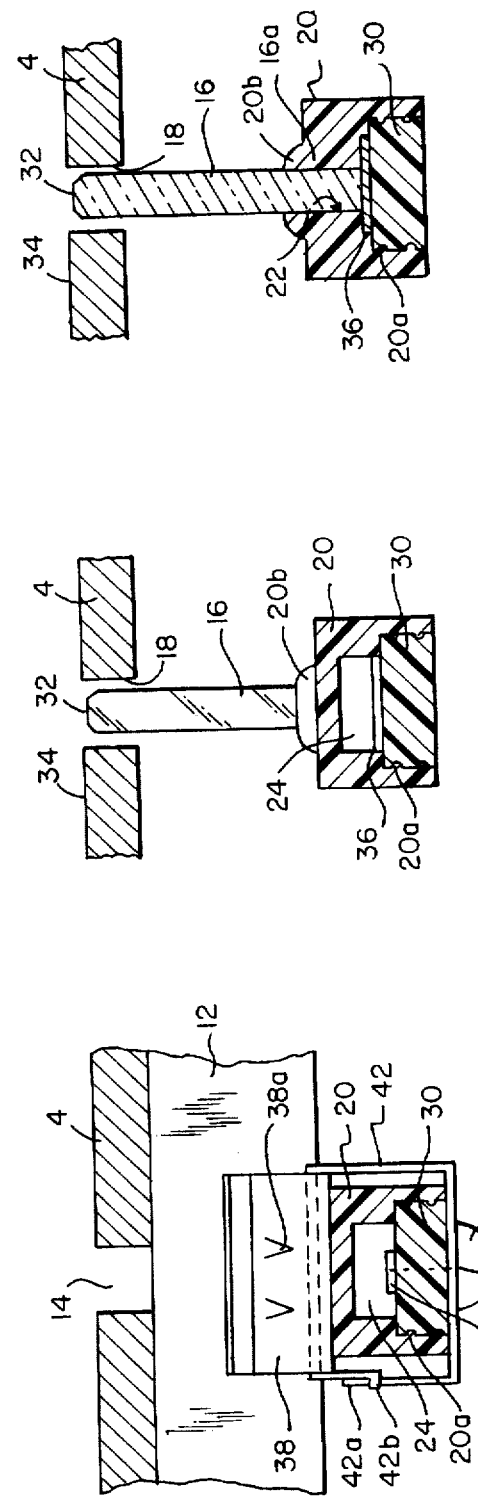

ILLUMINATED METAL GRATE

FIELD OF THE INVENTION

The present invention relates to an illuminated tree grate or the like, and, more particularly, to grates having lighting means arranged in slots or other open areas contained therein, thereby creating a lighting effect which provides safety, security, and, if desired, a form of advertising, and which enhances the appearance of the grate and surrounding landscape.

BRIEF DESCRIPTION OF THE PRIOR ART

The U.S. patent to Von Kohorn U.S. Pat. No. 4,686,611 discloses an illuminating apparatus in which light is projected upwardly through a compartmentalized grille to achieve a glare-free lighting effect of a three-dimensional object, such as a plant or sculpture. The purpose of the lighting is to illuminate an object positioned over the grille and, therefore, does not provide any decorative or ornamental lighting to enhance the aesthetic appearance of the grille itself. Rather, the light is simply projected through the grille.

The U.S. patent to Lloyd U.S. Pat. No. 640,140 discloses an illuminated sidewalk sign having an incandescent light which projects light upwardly through a sign level with the sidewalk which includes a layer of glass. The light is supported by a box placed in an opening in the sidewalk or by a support arm connected with the underside of the sidewalk. This device requires a large open space below the sign to house the lighting fixture which must be positioned directly below the sign to effectively illuminate the same.

The present invention was developed to overcome these and other drawbacks of the prior devices by providing a decoratively illuminated grate including glass inserts arranged in the variously shaped openings of the grate, and a light source positioned to direct light through the glass inserts.

SUMMARY OF THE INVENTION

Accordingly, it is a primary object of the present invention to provide a decoratively lighted grate in which the variously shaped openings of the grate contain translucent inserts positioned adjacent, and preferably slightly below, the top surface of the grate, which includes a light source for directing light through the translucent inserts.

It is a further object of the present invention to provide a lighted grate including a housing mounted on the grate for receiving both the translucent insert and the light source, which allows access for maintenance and service while providing a water-tight environment for the light source.

It is another object of the present invention to provide a lighted grate using electroluminescent lighting strips positioned adjacent the translucent insert.

BRIEF DESCRIPTION OF THE DRAWINGS

Other objects and advantages of the invention will become apparent from a study of the following specification when viewed in light of the accompanying drawings, in which:

FIG. 4 is a sectional view of a first embodiment of the invention;

FIG. 5 as a sectional view taken along line 5—5 of FIG. 4;

FIG. 6 is a sectional view taken along line 6—6 of FIG. 4;

FIG. 7 as a sectional view taken along line 7—7 of FIG. 4;

DETAILED DESCRIPTION

Figure 1:
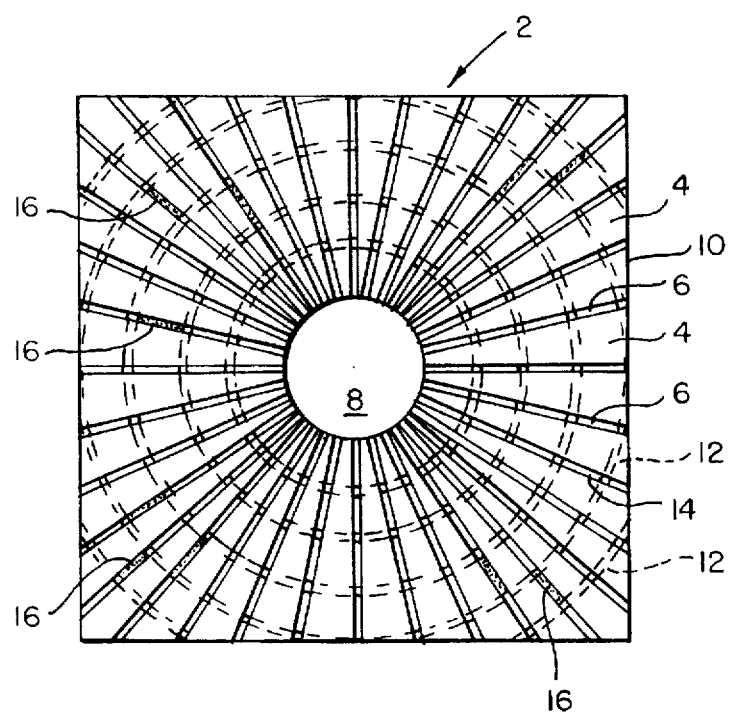
FIG. 1 is a top view of a square grate with radial openings or slots according to the invention.

Referring first to FIG. 1, a rigid grate 2 formed of cast iron, aluminum or bronze includes a plurality of radially extending, tapered, spaced slats 4 which define therebetween a plurality of slots 6 which extend radially outwardly from a central opening 8 to the outer edge 10 of the grate. A plurality of concentrically arranged annular support ribs 12 are provided on the underside of, and are integral with, the slats and divide each slot into a plurality of discrete slot segments 14. Alternatively, these slots can be arranged concentrically and can be formed in various shapes. Translucent inserts 16, which are formed of glass or a suitable synthetic plastic material such as Plexiglas™, are arranged within selected slot segments in an established random pattern.

The central opening 8 is provided for receiving, for example, the trunk of a tree or a fountain of water. Although illustrated as being square, the grate could, of course, be configured in various geometric shapes, such as a circle, half circle, or triangle. In addition, the top surface of the grate can be textured or include a decorative pattern. The top surface of the grate can also be contoured or warped slightly to promote drainage toward the outer edge of the grate.

Figure 2:
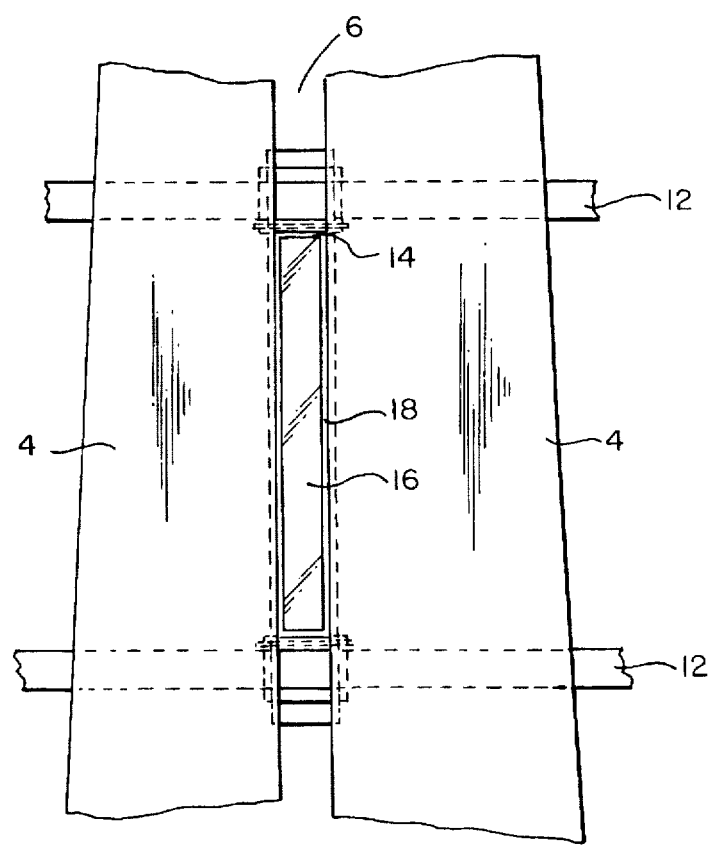
FIG. 2 is a detailed top view of a translucent insert arranged in a slot of the grate of FIG. 1.
Figure 3:
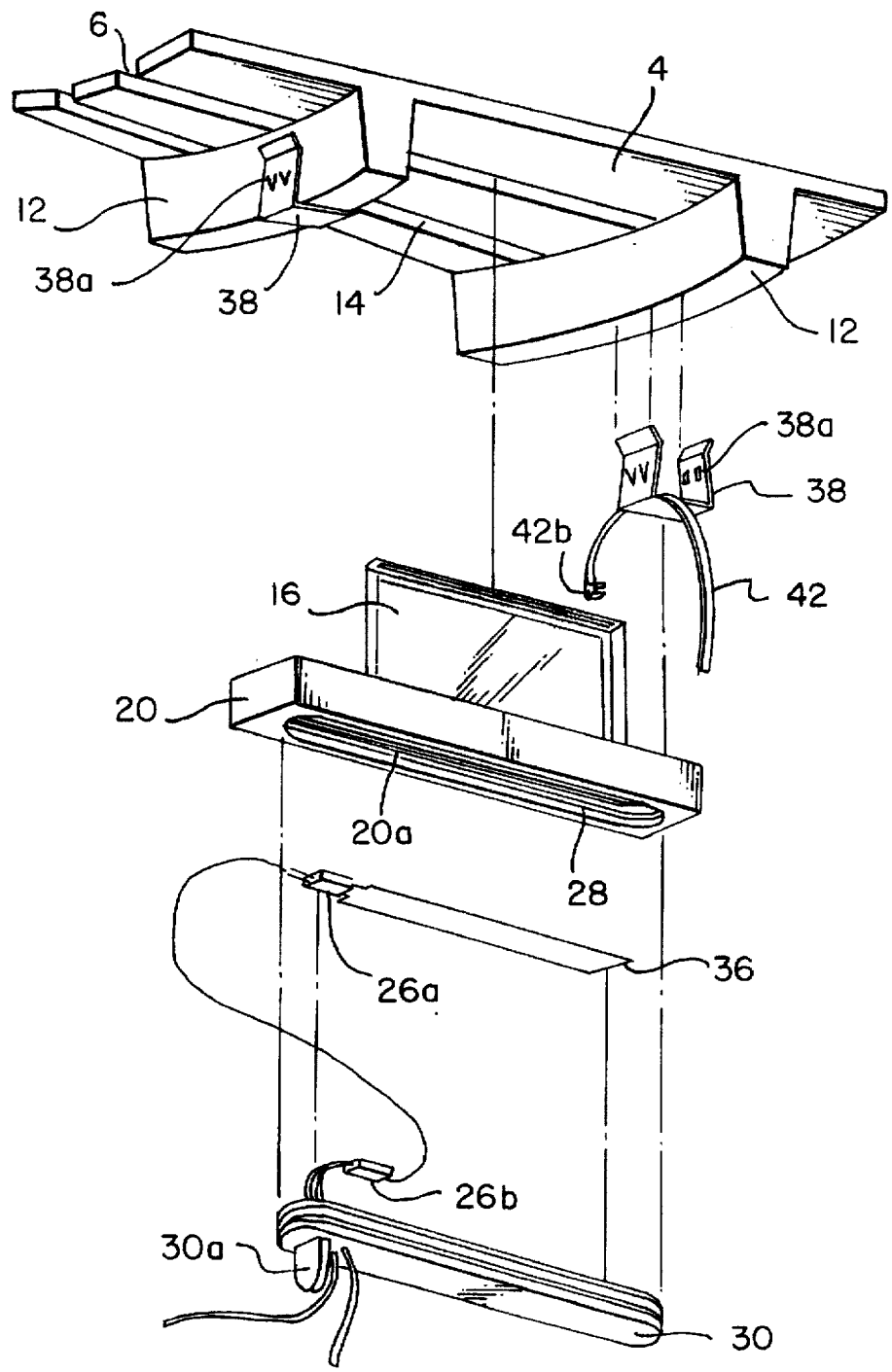
FIG. 3 is an exploded view of the lighting unit arranged below the grate of FIG. 1.

As shown in FIG. 2, a single translucent insert 16 is arranged in a slot segment 14 defined by a pair of slats 4 and a pair of support ribs 12. Preferably, a small open space 18 is provided between the insert and the adjacent slats, whereby the insert is essentially self-cleaning.

Referring now to FIGS. 3–7, a housing 20 arranged beneath a slot segment 14 contains a recess 22 for receiving the lower edge 16a of the insert, a chamber 24 (FIG. 4) for containing an electrical connector 26 and associated wiring, and an opening 28 which receives a closure plug 30. Ribs 20a are provided on the side walls of the opening for retaining the plug in place and for forming a leak-resistant seal. A raised shoulder portion 20b is provided around the recess 22 adjacent the insert 16 to further strengthen the housing body and to provide additional support for the insert.

As indicated above, the removable plug 30 forms the bottom of the housing and includes a pull tab 30a which allows the plug to be removed by hand from the housing. The plug therefore allows for access to the light and electrical connections contained in the chamber 24, and thereby facilitates routine maintenance and service. The housing 20 and plug 30 are molded from an elastomeric material, such as silicone, which allows for some degree of flexing under compression.

The insert 16 is preferably molded in position during the molding operation of the housing, thereby to prevent any possible movement and misalignment which may occur due to the housing flexibility and to prevent water from penetrating the housing. When mounted, the top edge 32 of the insert is positioned adjacent, and preferably slightly below, the horizontal top surface 34 of the grate. The top surface of the insert is bevelled to enhance its appearance and to minimize the accumulation of debris thereon, as best shown in FIGS. 6 and 7.

An electroluminescent lighting strip 36 is arranged between the insert and plug and is connected with the male end 26a of the connector which is in turn connected with a female end 26b.

Resilient clip means 38 are secured to the support ribs 12 below the slot segments 14. Each clip includes angled barbs 38a which prevent the clip from becoming disconnected from the support ribs. From the point where the leg portions 38b of the clip engage the support ribs, the legs angle outwardly away from the rib, thereby defining an open space 40 between the clip and support rib. A wire tie 42 is positioned through space 40 and around the housing to fasten the housing to the grate, the wire tie being tightened by pulling the free end 42a through the locking portion 42b.

Figure 8:
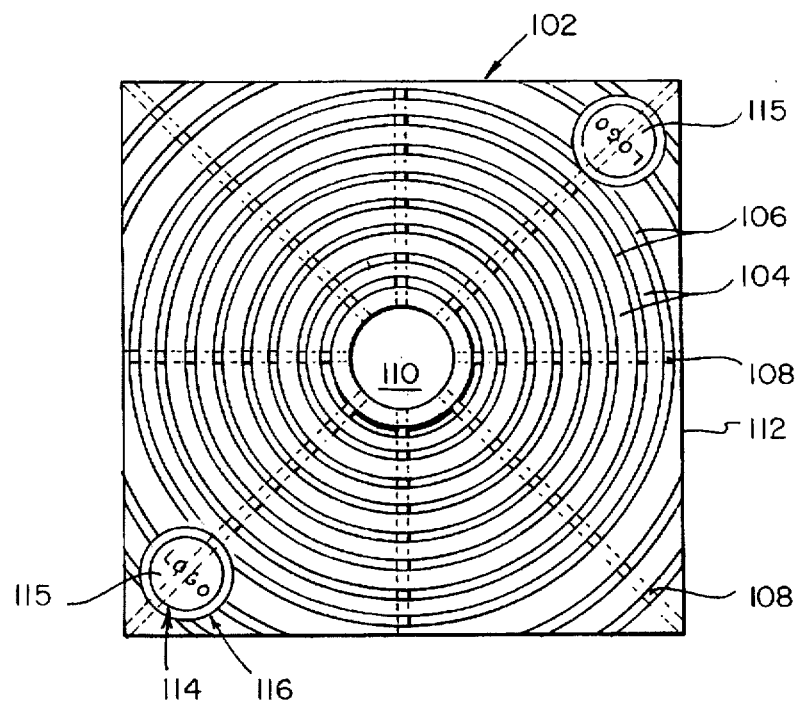
FIG. 8 is a top view of a second embodiment of the invention.

FIG. 8 illustrates a second embodiment of the invention wherein a square grate 102 includes a plurality of spaced annular slats 104 defining a plurality of concentrically arranged annular slots 106. Provided beneath the slats, and integral therewith, are a plurality of radially extending support ribs 108 which extend from a central opening 110 to the outer edge 112 of the grate and which serve to interconnect the slats. Circular slots or openings 114 for receiving lighting fixtures 115 as described below are contained in opposite corners of the grate. Alternatively, these openings could be formed to any geometric shape, such as a triangle, square, oval, or star. It will also be apparent that the grate could contain one or more such openings which could be arranged at various locations on the grate. Each opening is surrounded by an annular cast rim 116 formed integrally with the grate to which the lighting fixture is mounted.

Figure 9:
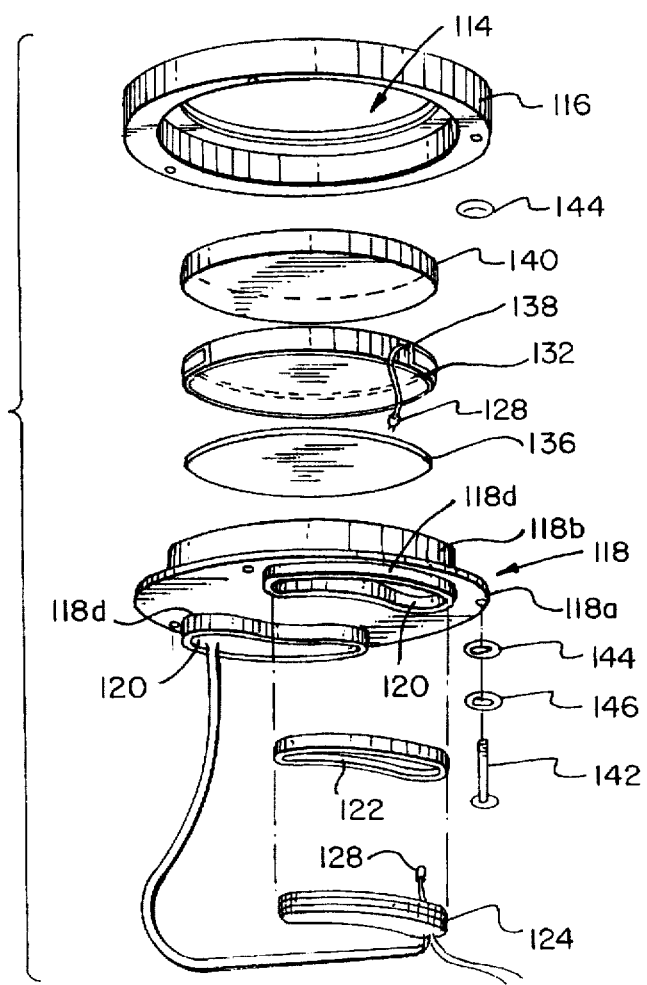
FIG. 9 as an exploded view of the embodiment of FIG. 8.
Figure 10:
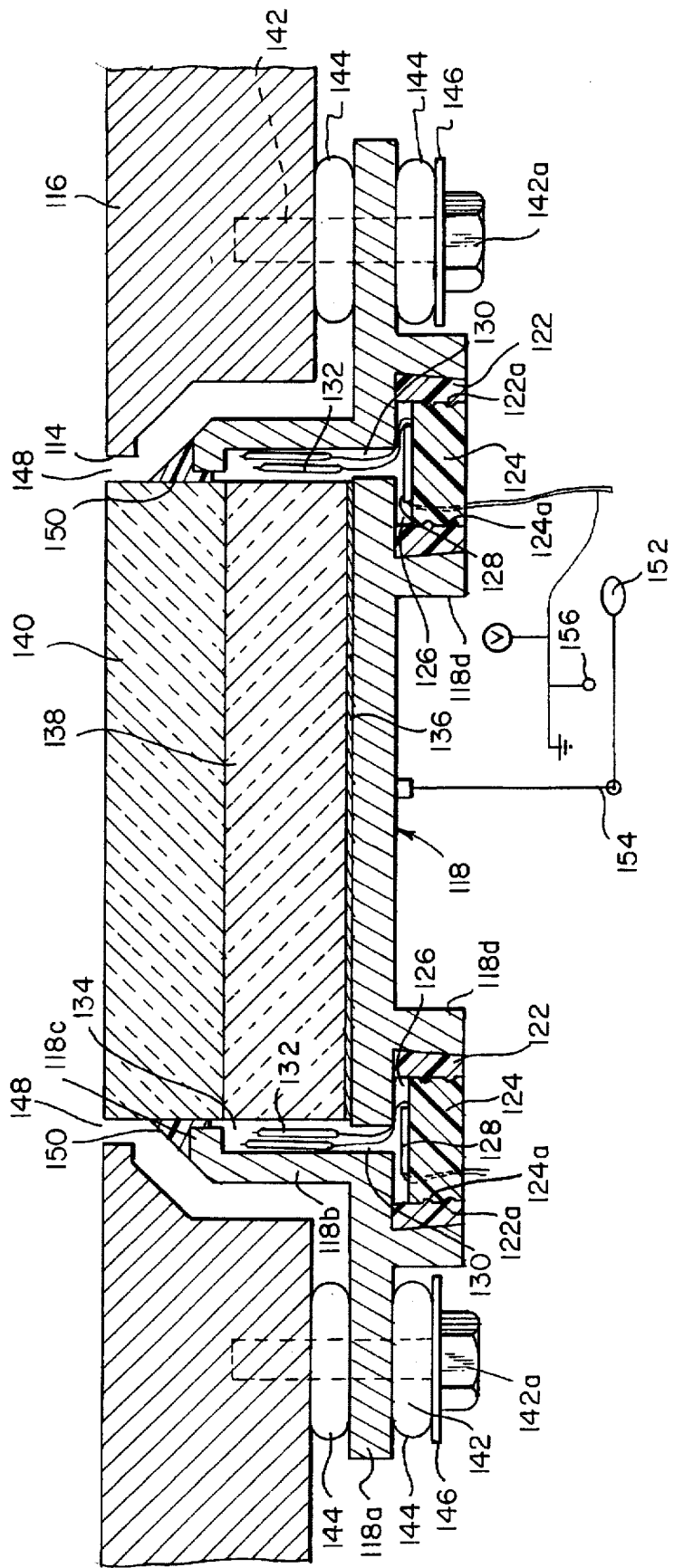
FIG. 10 is a sectional view of the embodiment of FIG. 8.

Referring to FIGS. 9 and 10, each lighting fixture 115 includes a housing 118 having a radially extending flange portion 118a, a cylindrical wall portion 118b extending upwardly from the inner edge of the flange portion, and an annular lip portion 118c that extends inwardly from the top of the cylindrical wall portion. The bottom of the housing includes a pair of downwardly protruding hollow integral wall portions 118d which define two plug ports 120. Depending on the diameter of the housing and the lighting requirements, any number of such ports may be provided. The plug ports are lined with synthetic plastic insulating adapters 122 which receive the plug members 124.

The adapters 122 include rib portions 122a which mate with grooves 124a on the plug to firmly secure the plugs in place and form a mating surface which prevents water from leaking into the housing. When the plug is inserted into the plug port, it extends only part way into the port, thereby leaving an open area or connector chamber 126 which contains the electrical connectors 128. Light guide openings 130 are provided at the top of the plug ports to provide access to the electroluminescent lighting strips 132 which are contained in a light chamber 134.

A stack of disc-shaped inserts 136, 138, and 140 are arranged in the circular opening defined by the upwardly extending cylindrical wall portion 118b and lip portion 118c of the housing 118. Insert 136 is a backing which may be formed of, for example, a high pressure laminate and acts as a background for art work, such as a company logo or the name of a country club or the like engraved on the bottom face of insert 138. Insert 138 is arranged above insert 136 and is encircled with the electroluminescent lighting strip 132. While the electroluminescent lighting strip is illustrated as encircling insert 138, it may also be arranged beneath insert 138 or beneath insert 136. In either case, the stack of disks is illuminated to produce the desired illuminating effect. Moreover, light emitting diodes (LED), neon lighting, microbulb incandescent lights, or fiber optic lighting may also be used for the light source. Insert 140 is a protective disc arranged on top of insert 138.

For increased stability, at least three mounting bolts 142 are used to mount the housing below the grate. Compressible elastomeric grommets 144 are arranged on the bolts both above and below the flange portion of the housing, thereby to provide resilient mounting for the lighting assembly. Washers 146 are provided adjacent the head 142a of the bolt to hold the lower grommet in place.

When mounted, the top insert 140 is positioned within opening 114 laterally spaced from the rim 116 to provide a water drainage slot 148. To ensure a watertight connection between the lip portion 118c of the housing and the insert 140, a layer of sealant 150, such as silicone, is applied to the area between the lip portion 118c of the housing and the side of the top insert 140.

The grate is also equipped with a high water level sensor which automatically turns-off the electricity if the water level below the grate reaches a predetermined height. The sensor includes a float 152 which is mounted on the bottom of the housing 118 via a hinged linkage 154. As the water level rises, the float pivots upwardly to engage contact 156, thereby creating a current path which shuts-off the electricity to the lighting unit.

While in accordance with the provisions of the Patent Statutes the preferred forms and embodiments of the invention have been illustrated and described, it will be apparent to those of ordinary skill in the art that various changes and modifications may be made without deviating from the inventive concept set forth above.

What is claimed is:

1. A lighted grate, comprising:
   (a) a horizontal grate body (2) having bottom and top surfaces, said body containing at least one through opening (14) communicating with said top surface; and
   (b) means for directing light energy upwardly through said grate body opening, including:
      (1) a horizontal housing (20) arranged below said grate body, an upper portion of said housing containing a recess (22);
      (2) a light source (36) arranged in a bottom portion of said recess;
      (3) a vertical translucent member (16) having a lower portion mounted in said recess adjacent said light source for directing light energy upon said translucent member, and an upper portion that extends upwardly from said housing; and
      (4) mounting means (38) for connecting said housing with said grate body at a position causing said translucent member to extend upwardly within said grate body opening.

2. A lighted grate as defined in claim 1, and further including electrical connector and wiring means arranged in said housing recess for energizing said light source.

3. A lighted grate as defined in claim 2, wherein said housing contains access means affording access to said recess.

4. A lighted grate as defined in claim 3, wherein said access means includes a removable plug member.

5. A lighted grate as defined in claim 1, wherein said translucent member has a generally parallelepiped configuration.

6. A lighted grate as defined in claim 1, wherein said housing is formed by injection molding from a synthetic plastic material.

7. A lighted gate as defined in claim 1, and further including sealing means forming a watertight seal between said translucent member and said housing.

8. A lighted grate as defined in claim 1, wherein said grate body contains a plurality of openings, and a plurality of vertical translucent members associated with said grate body openings, respectively, said translucent members being formed of glass.

9. A lighted grate as defined in claim 1, wherein said mounting means includes a plurality of resilient clips (38) connected with said grate body, and fastener means (42) connecting said housing with said clips.

10. A lighted grate as defined in claim 1, wherein said light source comprises an electroluminescent lighting strip.

* * * * *